No. 867,748. PATENTED OCT. 8, 1907.
W. B. NORTON.
MECHANICAL MOVEMENT.
APPLICATION FILED OCT. 16, 1905.
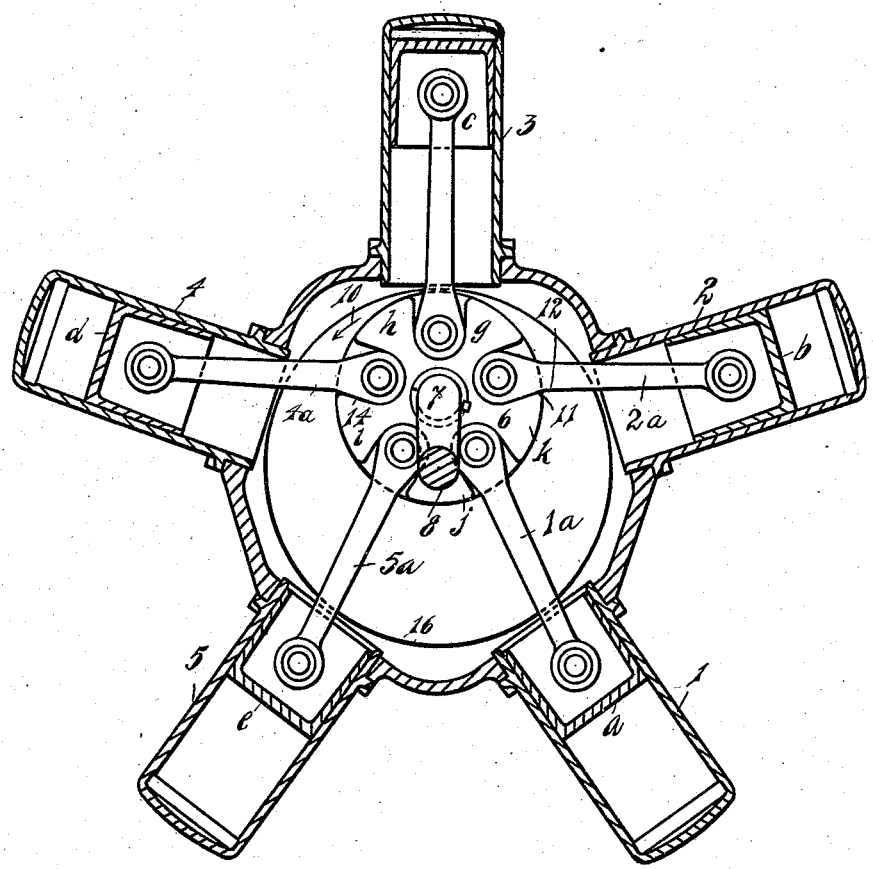
WITNESSES:
INVENTOR
William B. Norton
BY
Parker & Burton ATTORNEYS

UNITED STATES PATENT OFFICE.

WILLIAM B. NORTON, OF DETROIT, MICHIGAN.

MECHANICAL MOVEMENT.

No. 867,748.  Specification of Letters Patent.  Patented Oct. 8, 1907.

Application filed October 16, 1905. Serial No. 282,912.

*To all whom it may concern:*

Be it known that I, WILLIAM B. NORTON, a citizen of the United States, residing at Detroit, county of Wayne, State of Michigan, have invented a certain new and useful Improvement in Mechanical Movements; and declare the following to be a full, clear, and exact description of the same, such as will enable others skilled in the art to which it pertains to make and use the same, reference being had to the accompanying drawings, which form a part of this specification.

This invention relates to mechanical movements; it has for its object an improved movement employed to convert reciprocating motion into rotary motion.

The special object being to transmit the force of a number of radially arranged reciprocating pistons to a single crank pin on a crank-shaft that is symmetrically arranged with respect to the converging lines of movement of the several pistons, without making a long bearing along the axis of the crank pin and yet one with which I secure complete bearing around all pins.

The drawing indicates diagrammatically the shape and the action of the parts.

1, 2, 3, 4 and 5, indicate a number of motor cylinders in which are contained pistons $a$, $b$, $c$, $d$, and $e$, each of which has pivotally connected with it a rod that reaches to and is pivotally connected to a wrist plate 6. The wrist plate is on the wrist pin 7, of a crank shaft 8, which crank shaft is symmetrically arranged with respect to the converging axes of the radially distributed cylinders 1, 2, 3, 4 and 5. The wrist plate is provided with sockets for the reception of the ends of the connecting rods. The sockets are similar in construction and each socket has a semi-circular bearing surface toward the center of the plate and boundaries that extend from the termini of the semi-circular bearing surface to the perimeter of the wrist pin plate on lines that are parallel to a diameter of the wrist pin plate, making the socket a symmetrical cavity, equally disposed on two sides, of a radius with the bottom of the socket circular. Central to the circular part of the socket is a wrist pin, to which the end of the connecting rod connects. The end of the connecting rod which engages in the socket terminates with a curved surface that may bear closely against the bottom of the socket and that part of the end of the connecting rod, which is further removed from the extreme end slopes or tapers from the curved part toward the stem of the rod on lines which are constructed to engage closely against the straight walls of the socket, when the piston is about at the middle of its stroke both on its instroke and its outstroke; thus, presuming that the piston of the cylinder 1, is nearing its extreme throw toward the shaft and that the crank is moving in the direction of the arrow 10. The piston of cylinder 2 has nearly completed half of its stroke toward the shaft and at this period of the stroke the inclined side 11 of the cavity in the wrist plate 6 bears against the side 12 of the rod $2^a$, and the rod acts as a stop to prevent the plate from turning further on its own center, which it would tend to do because of the thrust of the rods $1^a$ and $2^a$.

On the opposite side of the structure, the rod $4^a$ engages closely against the face 14, and prevents the wrist pin plate from rocking or oscillating in the reverse direction. It is not intended to absolutely prevent oscillation of the wrist plate 6, but to so construct the engaging faces as to reduce this to a minimum by using great care in construction and by introducing springs. Oscillation might theoretically be prevented, but a very small amount of it is permissible without injurious results to the steady rotation of the crank 8. The wrist plate travels with that point that is farthest removed from the crank 8 traveling, on the circular path 16, around which it appears to roll with an apparent backward rotation, inasmuch as the points of contact between the plate and the path are reached consecutively in the order from $g$ to $h$, to $i$, to $j$ and to $k$, and while the plate really does not rotate at all because of its revolution around the center of the shaft A, it appears to do so.

There is a relative motion of the wrist pin 7, and the wrist plate, (that is, the pin turns around in its bearing in the plate), but this is practically steady and without such vibration or oscillation as to produce or allow any irregular movement of the pistons or any movement except that which is incident to the expansive power behind those that are exerting force, and a regular return movement of those that are not exerting force. The ends of the connecting rods which engage the pins on the wrist plate have full boxes or brasses, and likewise the crank-pin, and are absolutely connected so that there is no liability or possibility of breaking the connection at this point, as is the case with some characters of connections where a plurality of connecting rods have been caused to bear against a part of the circumference of the wrist-pin of the crank, a well known example is found in what is known as the Brotherhood engine, and I am not aware that there is any device in use in which as in this device there are a number of engines having fixed cylinders whose piston rods actuate the crank of a shaft to which they are connected by means of an interposed wrist plate in a way to allow several of the connecting rods to be employing their energy in actuating the shaft simultaneously, while others that have finished their actuating work are returning empty for a fresh impulse.

It is not essential that the converging axes of the piston lines of travel meet at a point, provided they are symmetrically arranged with respect to the center of the wrist pin plate.

What I claim is:—

1. In a mechanical movement for converting motion, in combination with a plurality of radially disposed cylinders, a plurality of pistons therefor, connecting rods pivoted to said pistons, a shaft central to said cylinders, a crank on said shaft, a wrist plate having a rotating connection with said crank and provided with sockets in which the ends of said connecting rods engage, the boundaries of said sockets being adapted to limit oscillation of the plate with respect to the several connecting rods, substantially as described.

2. In a mechanical movement for converting rectilinear to rotary motion, a crank shaft and a crank therefor, a plate mounted to rotate on said crank provided with sockets for the reception of the ends of connecting rods, fixed cylinders having rectilinearly moving pistons with connecting rods pivoted thereto, the said sockets being shaped to coact with the end of the connecting rod to prevent oscillation of the plate, substantially as described.

3. In a mechanical movement for converting rectilinear into rotary motion, a plurality of radially disposed cylinders, a plurality of pistons therefor, connecting rods pivoted to said pistons, a crank shaft provided with a crank, a plate arranged to rotate on said crank and provided with sockets, means for joining the connecting rods to the plate with the ends of said rods engaging in said sockets, each socket being adapted to limit the oscillation of the plate with respect to the connecting rod whose end engages therein, substantially as described.

4. In a mechanical movement for converting reciprocating into rotary motion, in combination with reciprocating pistons and a shaft provided with a crank, a plate on said crank provided with sockets having a circular boundary toward the center of the plate, and boundaries extending from the termini of the circular boundary to the perimeter of the plate on lines substantially parallel to a diameter of said plate combined with connecting rods having circular terminals, and a stem part narrower than the terminals with the intervening part between the stem part and the terminal adapted to engage closely against the straight walls of said socket when the connecting rod is oscillated on its connecting pin, substantially as described.

In testimony whereof, I sign this specification in the presence of two witnesses.

WILLIAM B. NORTON.

Witnesses:
   MAY E. KOTT,
   CHARLES F. BURTON.